Figure 1:
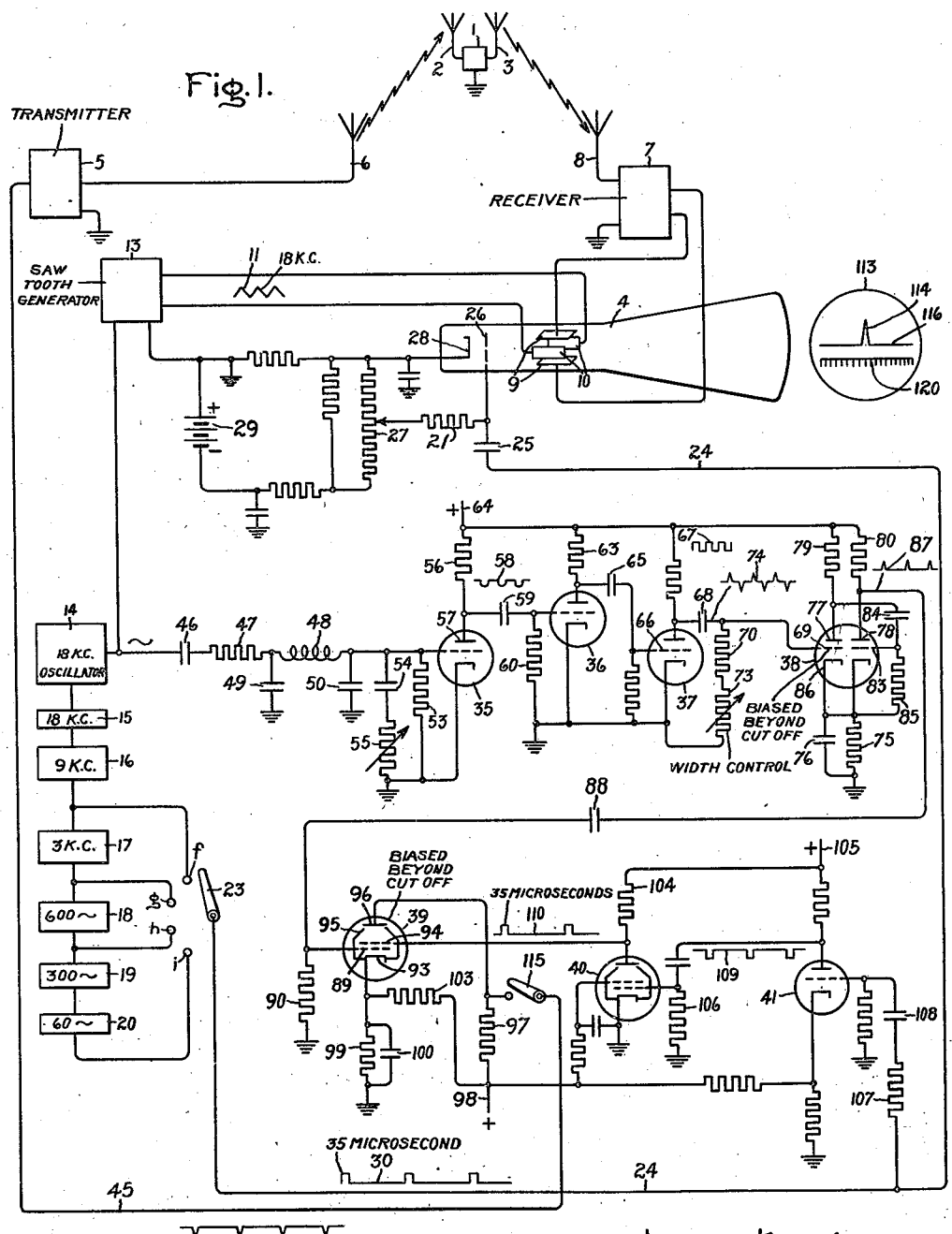

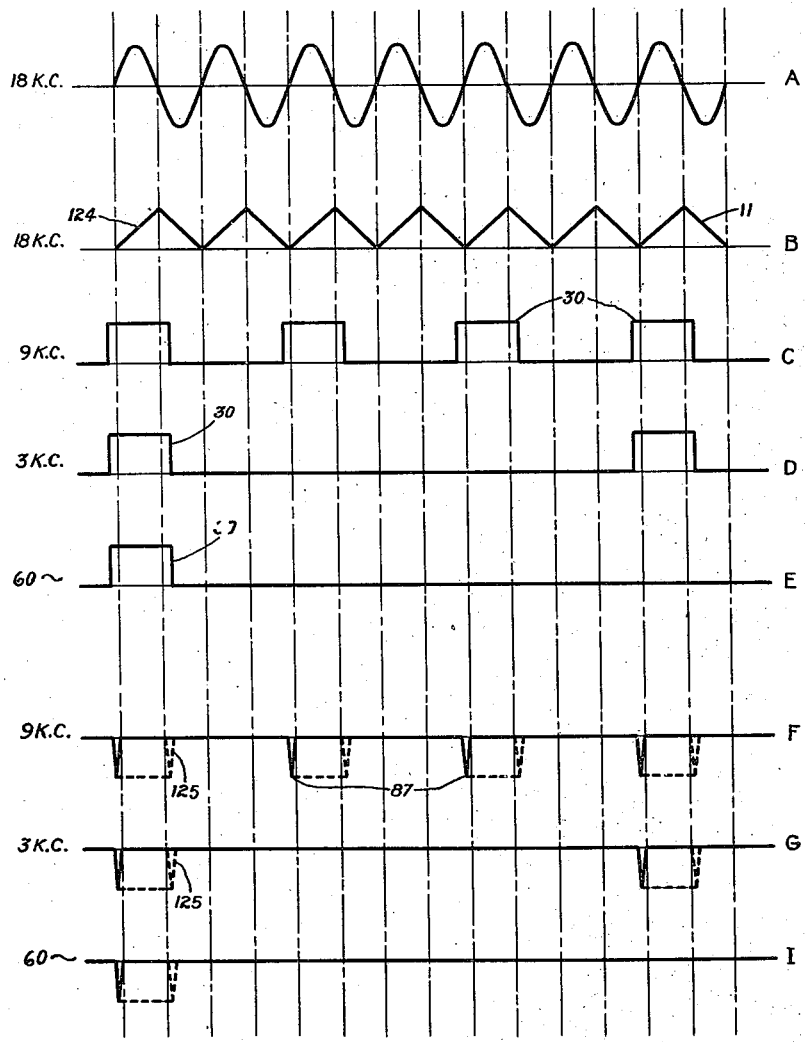

Patented Aug. 12, 1947

2,425,600

UNITED STATES PATENT OFFICE 2,425,600

PULSE RELAY TESTING SYSTEM

John C. Coykendall, Bridgeport, Conn., assignor to General Electric Company, a corporation of New York Application December 14, 1942, Serial No. 468,885

4 Claims. (Cl. 250—15)

My invention relates to pulse systems and particularly to means for testing the operation of pulse relaying equipment.

Equipment is now employed on aircraft, for example, for receiving pulses from the ground, or from other aircraft, and thereafter to relay back to the ground, or to such other aircraft, pulses of character to identify the craft from which they are radiated. Thus the operator at a ground station, or in an aircraft, may transmit to a remote aircraft carrying such equipment pulses of the character to which such equipment responds, and may then determine from the pulses received from the remote aircraft the identity of such remote aircraft without the attention of anyone on the remote aircraft and possibly while it is completely invisible from such transmitting ground, or aircraft, station.

My present invention relates to means for testing such relaying equipment, and it has for one of its objects to provide equipment of such character as to afford an adequate test and observation of the operation of such equipment under conditions satisfactorily comparable to those of actual practice.

A further object of my invention is to provide means whereby such operation may be observed upon the viewing screen of a cathode ray device.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents an embodiment of my invention, and Fig. 2 illustrates certain characteristics of its operation.

Referring to Fig. 1 of the drawing, I have indicated at 1 therein equipment of the type to be tested in accordance with my invention. This equipment comprises a pulse relay equipment having a receiving means such as an antenna 2 adapted to receive pulses of high frequency and of very short wave length, as, for example, waves of less than a meter in length, and to radiate, as from an antenna 3, corresponding pulses, which may be of a different wave length, and the character of which may be predetermined in accordance with the identity of the aircraft to be established.

The remainder of the equipment of Fig. 1 comprises equipment for the generation of pulses to be supplied to the equipment 1 and to receive therefrom corresponding pulses to be observed upon a cathode ray oscilloscope, which I have indicated at 4.

This equipment may comprise a conventional short wave transmitter 5 having a radiating antenna 6 and a conventional short wave pulse receiver 7 having a receiving antenna 8. The pulse receiver 7 may be of any suitable type used for pulse reception and includes means by which the received short wave pulses are converted to unidirectional pulses, which are supplied by the equipment 7 between the vertical deflection plates 9 of the cathode ray device 4.

The horizontal deflection plates 10 of the cathode ray oscilloscope may be supplied with a sawtooth wave from a sawtooth wave generator 13 whereby the ray of said device is deflected horizontally across the screen during the period over which a pulse may be received from the equipment 1. This sawtooth wave generator 13 is synchronized from a suitable high frequency oscillator 14 which may, for example, produce oscillations of 18 kilocycles, as denoted by the legend indicated thereon, and which operates to control not only the frequency of the sawtooth wave but also the repetition rate of the pulses radiated from antenna 6 and therefore the repetition rate of the pulses received in the equipment 7.

Oscillations from the 18 kilocycle oscillator are amplified by an amplifier 15, limited to a predetermined intensity, and supplied through a series of frequency dividers 16, 17, 18, 19 and 20, each of which operates to produce a square wave having a frequency which is a submultiple of the frequency of oscillator 14. For example, the frequency divider 16 may produce a square wave having a frequency of 9 kilocycles, and similarly the frequency dividers 17, 18, 19 and 20 may produce square waves having a frequency of 3 kilocycles, 600 cycles, 300 cycles and 60 cycles, respectively, if desired. All of these frequency dividers are adjusted to produce output pulses having positive portions of equal duration, the duration of the positive portion being equal to or slightly greater than the active sweep periods of the cathode ray oscillograph, i. e. equal to or greater than the duration of the rising portion of the sawtooth wave 11.

A selector switch 23 is arranged to select these pulses of like duration and of desired frequency, namely 9 kilocycles, 3 kilocycles, 600 cycles or 60 cycles, and to supply such pulses through conductor 24 and condenser 25 to the control electrode 26 of the cathode ray device 4. This control electrode is normally biased to extinguish the ray in the cathode ray oscilloscope, being connected through resistance 21 to a variable contact on a potentiometer 27 connected between the cathode 28 of the cathode ray device and the negative terminal of a source of bias potential indicated at 29. The positive pulses of this pulse wave, which is indicated in Fig. 1 at 30, overcome the negative bias normally supplied to the control electrode 26 and thus turn the ray of the cathode ray device on during its forward sweep, that is, during the rising portion of the sawtooth wave 11. Of course, during the negative portions of the square wave 30 this bias is not overcome and the cathode ray is extinguished during the falling portion of the sawtooth wave, and during the entire negative portion of wave 30 which may be many cycles of the wave 11 in length.

The electron discharge equipment shown in the lower portion of the drawing and which comprises discharge devices 35, 36, 37, 38, 39, 40 and 41 is likewise controlled by the oscillator 14 and operates to produce pulses of desired frequency and duration, which are supplied over conductor 45 to the transmitter 5 to key that transmitter and render it operative to radiate pulses of corresponding frequency, time relationship, and duration.

The operation of this equipment will now be described.

Oscillations, which may be of sine wave form, are supplied from the oscillator 14 through condenser 46, resistance 47 and a phase shift network comprising inductance 48 having opposite terminals thereof connected to ground through condensers 49 and 50, to the control electrode of discharge device 35. The cathode of this device is connected to ground and its control electrode is connected to ground through resistance 53. In shunt with condenser 50 is connected a second condenser 54 through a variable resistance 55, this resistance being variable to vary the phase of the oscillations supplied to the control electrode of device 35. That is, when resistance 55 is high, condenser 54 is effectively removed from the circuit and oscillations supplied to the control electrode have a certain time phase relation. When this resistance is low, condenser 54 is effectively connected in shunt with condenser 50 and these oscillations are of a different time phase relation. Thus, the oscillations supplied to the control electrode of device 35 are continuously variable in phase through a very large part of 180° by variation of the resistance 55.

Discharge device 35 operates to amplify the oscillations supplied to its control electrode and to supply the amplified oscillations through condenser 59 to the control electrode of device 36. During the rising portion of the anode voltage of device 35, however, the anode current approaches zero in value and thus the positive half cycles of voltage at the anode are limited as indicated at 58.

This wave is supplied through condenser 59 to the control electrode of discharge device 36 the latter of which is connected to ground through resistance 60. The cathode of the device 36 is connected to ground and its anode is connected through coupling resistance 63 to the positive terminal of the source of anode operating potential, which is connected to the lead 64, and designated by the plus sign indicated thereon. The negative side of this source of potential is connected to ground. This discharge device functions in a manner similar to that of device 35, the principal difference being that the control electrode of device 36 operates with higher grid leak bias because of the greater driving potential present at the control electrode. On positive half cycles, better anode current limiting is obtained because of the greater driving potential. This discharge device tends to square further the wave 58. Thus the voltage wave which appears on the anode of device 36 is substantially square during both half cycles.

This wave is supplied through condenser 65 to the control electrode of discharge device 37 and is effective during the negative half cycle in producing anode current cutoff in that device, and during the positive half cycle in producing anode saturation. Thus this discharge device additionally squares the wave supplied to its grid and a satisfactory square wave as indicated at 67 appears on its anode.

This wave is supplied through condenser 68 to the control electrode 69 of the device 38 the latter of which is connected to ground through a pair of resistances 70 and 73, the latter of which is variable. This condenser resistance combination operates to differentiate the square wave and to produce a wave across the resistances 70 and 73 of the form indicated at 74 comprising a sharp pulse at each rise in voltage of the wave 67 and a sharp negative pulse during each drop in voltage of the wave 67. The width of these sharp pulses is controlled by variation of the resistance 73.

The discharge device 38 comprises two triodes arranged in the same envelope. The two cathodes are connected together and to ground through a resistance 75 shunted by capacitance 76. The respective anodes 77 and 78 are connected to the positive side of the source of operating potential through respective resistances 79 and 80. The anode 77 is coupled to the control electrode 83 through a capacitance 84 and control electrode 83 is connected to the cathode through a resistance 85.

So connected, the right hand triode 78, 83 of this discharge device normally passes a large anode current through resistance 75. The potential on resistance 75 is sufficiently great to prevent the flow of anode current in the left hand triode 77, 69, 86; that is, the cathode 86 is sufficiently positive with respect to ground and with respect to the control electrode to prevent the flow of electrons from the cathode to the anode. Thus the sharp negative pulses of the wave 74, which are supplied to the control electrode 69, have no effect upon the triode 77, 69, 86. The sharp positive pulses, however, overcome the bias voltage of resistance 75 and cause anode current to flow in this triode thereby producing a drop in voltage on the anode of this device during these positive pulses. Thus a wave of sharp negative pulses appears on the anode 77. This wave is supplied to the control electrode 83 through condenser 84 and produces sharp drops in current in this device during the negative pulses. Thus a wave of sharp positive voltage pulses, as indicated at 87, appears on the anode 78.

This wave of sharp positive pulses is supplied through condenser 88 to the control electrode 89 of the device 39, this control electrode being connected to ground through the resistance 90. This device is preferably of the screen grid beam type having a cathode 93, control electrode 89, screen electrode 94, beam forming electrodes 95 and an anode 96 the latter of which is connected through resistance 97 to the positive terminal of a source of operating voltage at the terminal 98. The cathode 93 is connected to ground and to the negative terminal of the source of anode operating voltage through a resistance 99 shunted by a condenser 100 and through resistance 103 to the terminal 98 of said source of anode operating potential. Current flowing from the source of operating potential through resistances 103 and 99 maintain the cathode 93 substantially above ground and substantially positive with respect to the control electrode 89. The screen grid electrode 94 of this device is connected through resistance 104 to the positive terminal of the source of anode operating potential at 105 and through electron discharge device 40, of the beam type, to ground. The control electrode of the discharge device 40 is connected to ground and to the cathode thereof through resistance 106 and thus this device normally passes a substantial anode current, this current being sufficient to produce a drop in voltage on resistance 104 sufficiently large to maintain the potential on screen grid 94 either at the potential of the cathode 93 or negative with respect to the cathode, that is, at a potential sufficiently low to prevent normally the flow of anode current in the device 39. Thus the sharp pulses of the wave 87 supplied to the control electrode 89 are not normally reproduced in the output circuit of this device.

However, as previously explained, the positive pulses, which may recur at a frequency of 9 kilocycles, 3 kilocycles, 600 cycles or 60 cycles selected by the switch 23, are supplied through resistance 107 and condenser 108 to the control electrode of the device 41 whereby this wave is repeated as a negative pulse wave indicated at 109 and is supplied to the control electrode of the device 40. The negative pulses of the wave 109 reduce the anode current in the device 40 during these negative pulses thereby reproducing this wave as a positive pulse wave on the anode of this device, this positive pulse wave being again indicated at 110. This wave 110 is of the same form as the wave 30. During the positive pulses of the wave 110 the screen grid 94 is driven positive with respect to the cathode, but not sufficiently to cause anode current to flow therein except when a pulse of the wave 87 is also present on the control electrode 89. During such pulses current flows and that portion of these pulses 87 which occur during the positive portions of square wave 110 are repeated in the anode circuit of device 96. Thus this device is rendered operative only during these positive pulses of wave 110 to reproduce in its anode circuit sharp pulses supplied to the control electrode 89 thereof from the discharge device 38 during these intervals. Thus these sharp pulses recur on resistance 97 with a frequency corresponding to the position of switch 23. These pulses are supplied over conductor 45 to the transmitter 5 to key that transmitter.

The positive pulses of the waves 30 and 110 are of about 35 microseconds duration; that is, they are slightly longer than the period of one half cycle of the 18 kilocycle wave produced by the oscillator 14 and slightly longer than the rising portion of the sawtooth wave 11. This means that during any positive pulse of the wave 110 only one pulse of the wave 87 occurs and thus only those pulses of the wave 87 are supplied to the transmitter over conductor 45 which occur during the positive pulses of the wave 110. In other words, the pulses of the wave 87 are reproduced on conductor 45, but with a frequency dependent upon the position of the switch 23. Thus these pulses may recur with a frequency of 9 kilocycles, 3 kilocycles, 600 cycles or 60 cycles dependent upon the position of switch 23.

Thus the transmitter 5 is keyed to radiate sharp pulses of minute duration, determined by the structure of the transmitter itself, and by the duration of the applied keying pulse, but at a frequency determined by the position of the switch 23. These pulses may be radiated by antenna 6 and received by the antenna 2 of the equipment 1 to be tested and which equipment responds to radiate similar pulses of a different carrier wave frequency to identify the equipment 1. These latter pulses are received on the antenna 8, translated to unidirectional pulses by the equipment 7, and are then supplied between the vertical deflection plates 9.

One such pulse between the vertical deflection plates occurs during a horizontal deflection of the cathode ray and thus an indication is produced upon the viewing screen of the cathode ray device such as that indicated in the circle 113 in which the pulses received in the equipment 7 are indicated by the vertical deflection of the cathode ray indicated at 114. If the equipment be in operation with selector switch 23 on one of its four or more positions, as the case may be, and with switch 115 open, no pulses are received in the equipment 7 and only a horizontal line 116 is seen upon the viewing screen of the cathode ray oscillograph. With switch 115 closed, however, thereby to supply the keying pulses over the conductor 45 to the transmitter 5, the vertical deflection 114 appears in response to the received pulses.

The shape of the vertical deflection 114 may be observed by the operator to determine the character of the operation of the equipment 1 to be tested. This observation may be made when pulses are supplied through equipment 1 at any of the different frequencies selected by the switch 23. Moreover, by variation of resistance 55, as previously described, to vary the phase of the 18 kilocycle wave supplied through the network, 48, 49, 50, 54, this pulse received in the equipment 7 may be shifted in phase through a large part of 180° of the 18 kilocycle wave and thus the deflection 114 may be moved horizontally across the viewing screen of the cathode ray oscillograph. Its position and the width of the pulse may be observed and compared with a pre-arranged scale 120 which may be either marked upon the fluorescent screen of the cathode ray oscillograph itself or upon a scale mounted adjacent thereto. The width of the radiated pulses may be varied by variation of resistance 73 and the effect of such variation on the received pulses may be noted on the cathode ray device.

The operation of the equipment is somewhat more clearly portrayed in Fig. 2. The 18 kilocycle sine wave produced by the oscillator 14 is indicated in Fig. 2 at A. The 18 kilocycle sawtooth wave 11, which is employed to produce the horizontal deflection of the cathode ray oscillograph, is indicated at B directly beneath the wave A and on the same time base. Time is plotted as abscissa in all of the graphs of Fig. 2. The 9 kilocycle square pulse wave 30 of Fig. 1 produced with the switch 23 in its position f is next indicated at C in Fig. 2. If the switch 23 be in its position g, this wave 30 is of 3 kilocycles as indicated in Fig. 2 at D. If switch 23 be in its position i, the wave 30 is of 60 cycles as indicated at E. Only one pulse of this wave is indicated in Fig. 2.

The positive pulses of the different 9 kilocycle, 3 kilocycle and 60 cycle pulse waves are all of the same duration as noted in Fig. 2, being of about 35 microseconds or slightly greater than the duration of the rising portion 124 of the sawtooth wave 11, and slightly greater than the duration of the positive portion of the sine wave A.

The sharp pulse wave on conductor 45, which is used to key the transmitter 5 may be of a frequency determined by the switch 23 and these waves are indicated at F, G and I in Fig. 2. If the switch 23 be in its position g, then these pulses recur at the 3 kilocycle frequency, as indicated at G in Fig. 2. If it be in its position i, then they recur at the 60 cycle frequency, as indicated at I in Fig. 2. Of course, as previously stated, these pulses are variable in time over approximately 180° of the 18 kilocycle wave by variation of the phase of that wave as by varying resistance 55. Thus the time of occurrence of the sharp pulses 125 of waves F, G and I may be varied over the duration of the rising portion 124 of the sawtooth wave 11, or over the duration of the horizontal sweep of the cathode ray. This variation in phase or in time of the pulses of the waves F, G and I are indicated by dotted lines in Fig. 2.

Thus the operator with the equipment described may observe upon the viewing screen of the cathode ray oscilloscope the character of the pulses produced by the equipment 1 under test while this equipment is operating to receive pulses from the transmitter 5 at the different frequencies determined by the switch 23. Similarly he may observe the effect of any phase shift produced by the resistance 5 upon the character of the pulses produced by the equipment 1, and he may also observe the response of equipment 1 to change in duration of the pulses received thereby.

While I have shown a particular embodiment of my invention, it will of course be understood that I do not wish to be limited thereto since different modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. In combination, a source of oscillations of high frequency, means to generate from said oscillations short pulses of the same frequency and of duration short relative to a half cycle of said oscillations, means to generate from said oscillations independently of said last means longer pulses having a frequency equal to a subharmonic of said oscillations and having duration greater than half but less than a full period of said oscillations, an electron discharge device having an output circuit, means to supply both said short and longer pulses to said discharge device, means to bias said discharge device to be non-conductive in the presence of either said short or said long pulses and to be conductive in the presence of both said short and longer pulses together to an extent dependent upon the combined effect of said longer pulse and any short pulse occurring during such longer pulse, and means to vary the time of occurrence of said short pulse in an instant one of said longer pulses, whereby said short pulses are reproduced in the output of said discharge device with said subharmonic frequency and with variable phase.

2. In a system for testing pulse relays, a source of high frequency oscillations, a cathode ray device having horizontal and vertical deflection means and a control electrode, means to generate from said oscillations a saw-tooth wave and a sharp pulse wave of the same frequency as said oscillations and a square pulse wave of frequency equal to a subharmonic of said oscillations, means to supply said sawtooth wave to one of said deflection means and said square wave to said control electrode in sense to increase the intensity of the ray of said device, said square pulse occurring simultaneously with like portions of said sawtooth wave, means to supply said sharp pulses to the relay to be tested and to supply the relayed pulse to the other of said deflection means, and means to prevent operation of said last means to supply pulses to said relay during intervals between said square pulses of subharmonic frequency.

3. In a system for testing pulse relays, a source of high frequency oscillations, a cathode ray device having horizontal and vertical deflection means and a control electrode, means to generate from said oscillations a sawtooth wave and a sharp pulse wave of the same frequency as said oscillations and a square pulse wave of frequency equal to a subharmonic of said oscillations, means to supply said sawtooth wave to one of said deflection means and said square wave to said control electrode in sense to increase the intensity of the ray of said device, said square pulse occurring simultaneously with like portions of said sawtooth wave, means to supply said sharp pulses to the relay to be tested and to supply the relayed pulse to the other of said deflection means, means to prevent operation of said last means to supply pulses to said relay during intervals between said square pulses of subharmonic frequency, and means to vary the phase relation between said sharp pulse wave and said sawtooth wave while the phase relation between said sawtooth wave and square pulse wave remains fixed.

4. In a system for testing pulse relays, a cathode ray device having horizontal and vertical deflection means, a control electrode biased to extinguish the ray of said device and a viewing screen, a source of high frequency oscillations, means to generate from said oscillations a sawtooth wave, a sharp pulse wave of variable time phase and a square wave, said sawtooth and sharp pulse waves being of the same frequency and said square wave being of frequency equal to a subharmonic thereof, the pulses of one sense of said square wave coinciding in time with variations in one sense of said sawtooth wave, means to supply said sawtooth wave to one of said deflection means and said square pulse wave to said control electrode in sense to overcome said bias during said like variations of said sawtooth wave, means to supply pulses to the relay to be tested in response to said sharp pulses of said sharp pulse wave, means to prevent operation of said last means during periods between said pulses of subharmonic frequency, and means to supply the output from said relay to be tested to said other deflection means.

JOHN C. COYKENDALL.

REFERENCES CITED

The following references are of record in the file of this patent:

UNITED STATES PATENTS

| Number | Name | Date |
|---|---|---|
| 2,212,420 | Harnett | Aug. 20, 1940 |
| 2,221,666 | Wilson | Nov. 12, 1940 |
| 2,171,536 | Bingley | Sept. 5, 1939 |
| 2,105,870 | Vance | Jan. 18, 1938 |
| 2,145,332 | Bedford | Jan. 31, 1939 |

FOREIGN PATENTS

| Number | Country | Date |
|---|---|---|
| 510,881 | Great Britain | Aug. 8, 1939 |